United States Patent
Kennedy et al.

(10) Patent No.: US 9,126,758 B2
(45) Date of Patent: Sep. 8, 2015

(54) ARRANGEMENTS FOR TRANSFERRING ARTICLES

(76) Inventors: Hamish Alexander Nigel Kennedy, Auckland (NZ); Robert James Vercoe, Auckland (NZ); Marcus John Davies, Auckland (NZ); Adam Alexander Tebbutt, Auckland (NZ)

( * ) Notice: Subject to any disclaimer, the term of this patent is extended or adjusted under 35 U.S.C. 154(b) by 0 days.

(21) Appl. No.: 13/878,382

(22) PCT Filed: Oct. 6, 2011

(86) PCT No.: PCT/NZ2011/000209
§ 371 (c)(1),
(2), (4) Date: Jun. 5, 2013

(87) PCT Pub. No.: WO2012/047119
PCT Pub. Date: Apr. 12, 2012

(65) Prior Publication Data
US 2013/0319815 A1    Dec. 5, 2013

(30) Foreign Application Priority Data
Oct. 6, 2010   (NZ) .................................. 588434

(51) Int. Cl.
| | |
|---|---|
| B65G 47/06 | (2006.01) |
| A01D 46/24 | (2006.01) |
| B65G 11/00 | (2006.01) |
| B65G 11/02 | (2006.01) |
| B65G 47/44 | (2006.01) |
| B65G 47/52 | (2006.01) |
| B65G 47/53 | (2006.01) |
| B65G 11/20 | (2006.01) |

(52) U.S. Cl.
CPC .............. *B65G 11/00* (2013.01); *B65G 11/023* (2013.01); *B65G 11/20* (2013.01); *B65G 47/44* (2013.01); *B65G 47/52* (2013.01); *B65G 47/53* (2013.01); *B65G 2201/0211* (2013.01)

(58) Field of Classification Search
USPC ................... 193/2 R, 7, 12, 14, 23, 25 A, 2 D
See application file for complete search history.

(56) References Cited

U.S. PATENT DOCUMENTS

| | | | |
|---|---|---|---|
| 2,537,320 A | | 1/1951 | Stauffer |
| 3,252,560 A | | 5/1966 | Chamberlin |
| 3,891,080 A | * | 6/1975 | Neises .......................... 198/531 |
| 4,010,842 A | * | 3/1977 | Smith ........................... 198/394 |
| 4,176,997 A | * | 12/1979 | Hungerbach .................. 414/299 |
| 4,193,489 A | * | 3/1980 | Siniscal ......................... 198/406 |
| 4,199,913 A | | 4/1980 | Hood et al. |
| 4,300,445 A | * | 11/1981 | Hazen ............................. 99/458 |
| 5,636,723 A | * | 6/1997 | Bulle et al. ................. 198/367.1 |
| 6,026,947 A | | 2/2000 | Persson |
| 6,050,390 A | * | 4/2000 | Fortenbery et al. ...... 198/370.03 |
| 6,119,842 A | * | 9/2000 | Richardson et al. .......... 193/2 R |

(Continued)

FOREIGN PATENT DOCUMENTS

| | | |
|---|---|---|
| DE | 3238683 | 4/1984 |
| JP | 2296618 | 12/1990 |

*Primary Examiner* — Douglas Hess
(74) *Attorney, Agent, or Firm* — Lowe Graham Jones PLLC (57) ABSTRACT

An apparatus for the processing of articles (5) is disclosed. The apparatus includes guide means (1) having a body, a first end (2) for receiving articles, and a second end (3) for dispatching articles. The apparatus may be used to transfer articles (5) from a first conveyor means to a second conveyor means with a reduced likelihood of the articles colliding with other articles.

18 Claims, 9 Drawing Sheets

(56) References Cited

U.S. PATENT DOCUMENTS

| | | | |
|---|---|---|---|
| 6,305,551 B1 * | 10/2001 | Ruymen | 209/644 |
| 6,315,159 B1 * | 11/2001 | Paczkowski | 221/312 R |
| 6,371,275 B1 * | 4/2002 | Terrell et al. | 198/367 |
| 6,874,615 B2 * | 4/2005 | Fallas | 198/459.8 |
| 6,966,417 B2 * | 11/2005 | Peklo et al. | 194/344 |
| 8,485,336 B2 * | 7/2013 | Tenold et al. | 193/33 |
| 8,485,345 B2 * | 7/2013 | Klutz | 198/535 |
| 8,714,366 B2 * | 5/2014 | Dirix et al. | 209/655 |

* cited by examiner

ARRANGEMENTS FOR TRANSFERRING ARTICLES

FIELD OF INVENTION

The invention relates to the transfer of articles from one point to another. More particularly, the invention relates to the transfer of articles travelling at speeds at which they may become damaged due to collisions that occur with structural elements defining a path for the articles, as well as with other articles. According to preferred embodiments, the invention relates to the transfer of articles from a first conveyor means to a second conveyor means.

BACKGROUND

Various means are known for the automated processing of articles. An example of the application of this technology is in the fruit sorting and packing industry. WO 2004/67417 describes arrangements that may be used with such systems. More particularly, it describes carriers that convey articles along a conveyor. During this passage, the articles may be inspected and ejected from the carrier to a destination that is selected based on the results of the inspection. While not limited thereto, following sorting, the articles are often passed to a second conveyor, which may be in the form of a belt conveyor rather than the preferred discrete carriers illustrated in WO 2004/67417. The second conveyor may pass the articles on for subsequent processing such as packing. Alternatively, for example, buckets or other containers may be provided instead of the second conveyor that enable articles having similar characteristics to be batched together and subsequently transferred in bulk.

To maximise throughput, the first and second conveyors travel at some speed. This, in combination with the need to impart a reasonable degree of force to eject the articles from the first conveyor, the possible difference in height between the first and second conveyors and the common requirement to change the direction of travel from that of the first conveyor to that of the second conveyor can damage the articles being processed during transfer from the first conveyor to the second conveyor. For foodstuffs such as fruit, this can seriously affect appearance and marketability.

To this end, some systems have provided linear gradient chutes which aid in the transfer of articles from the first conveyor to the second conveyor. These have conventionally been arranged such that articles travel along the chutes perpendicular to the direction of travel of the second conveyor. While these do prevent articles from being subjected to excessive drops in height where the second conveyor is somewhat lower than the first conveyor, they still result in the articles arriving at the second conveyor with considerable speed and hence the extent of damage to the articles is only lessened. Some arrangements provide padding to the walls of the second conveyor such that the major impacts of the articles against the supporting structure are mitigated.

In arrangements such as those described in WO 2004/67417, articles are processed at high rates. Consequently, any temporary blockage in the processing stream can result in collisions between the articles which also causes damage. As will be appreciated, articles will temporarily stall when colliding with a padded wall. Consequently, while the effects of colliding with the surrounding walls are mitigated, collisions and damage are generated as a result of these measures between the articles themselves.

It is an object of the invention to provide improved arrangements for the transfer of articles from one point to another so as to at least mitigate the aforementioned problems.

Alternatively, it is an object to provide arrangements for reducing the likelihood of articles being processed from colliding with other such articles during processing thereof.

Alternatively, it is an object of the invention to at least provide a useful choice to the public.

SUMMARY OF THE INVENTION

In broad terms, the invention provides for the improved transfer of articles from one point to another. Preferred embodiments include means for decelerating the articles during the transfer, reducing the likelihood of damage being caused to them.

In broad terms, the invention additionally or alternatively provides for the improved distribution of articles subsequent to said transfer. Such measures help reduce collisions between the articles, at least when travelling at relatively high speeds.

The below aspects and embodiments related to these broad concepts may be used in any combination or in isolation, as would be apparent to one skilled in the art without invention using the disclosure provided herein.

According to a first aspect of the invention, there is provided apparatus for transferring an article, the apparatus including:

guide means, the guide means having a first end for receiving the article and a second end for dispatching the article.

The guide means may be formed as a single integrated unit, or from a plurality of sections which may be coupled together as desired.

Preferably, the guide means is formed by injection moulding.

Preferably the first end is more elevated than the second end. In such an arrangement, the article may move from the first end to the second end substantially due to gravity.

Preferably, the guide means has a low-friction surface. While this seems contrary to the objective of reducing the speed of the articles, it has been found that this addresses the broader object of preventing damage to the articles by aiding in preventing blockages or bunching of articles, particularly during the early stages of transfer when the articles travel at high speed and are likely to cause damage in the event of impact between one another. Consequently, the inventors have recognised that the wider control of speed is important, rather than simply reducing speed.

The apparatus may be configured such that the second end, in use, is proximate a surface on which the articles are received or spaced away therefrom. While having the second end elevated above the surface may result in some damage being caused to the articles, this arrangement can provide advantages. For example, where a plurality of the apparatus are configured to transfer articles to a belt conveyor, elevating the second end of the guide means to a height greater than the height of the articles enables the articles to pass thereunder. Hence, the guide means does not cause obstruction and reduce the useful width of the conveyor.

Preferably, the first end provides a substantially horizontal edge for receiving the article.

Preferably, the second end provides a concave surface for securely directing passage of the article.

Preferably, the surface of the guide means gradually changes from being horizontal at the first end to concave at the second end.

The provision of a substantially horizontal receiving edge that gradually forms a concave profile at the second end, reduces the drop in height that is required for articles to be received into the guide means but still enables the guide means to despatch articles from the second end of the guide means with a more controlled point of exit and direction of travel. However, the invention is not limited thereto and the first end may have a substantially U-shaped profile.

Preferably, the guide means is configured to alter the direction of travel of the articles between the first and second ends. For example, the guide means may include a bend.

Preferably, the change in direction is other than vertical although changes in the gradient of the guide means between the first and second ends, other than linear, are also included within the scope of the invention.

Such arrangements can be used where the articles are received travelling in a first direction and it is desired to subsequently convey them in a second, different direction. This reconfiguration of the guide means enables the two paths to better match, reducing the likelihood of collisions of the article with the surrounding structure.

Preferably, the guide means is substantially L-shaped when viewed from above.

Preferably, the surface of the guide means is configured to cause the articles to move in a substantially L- and/or S-shaped path.

When the guide means is substantially L-shaped, with the apex preferably rounded, articles that follow the path around the outer edge of the guide means generally travel smoothly. However, articles that travel proximate the inner side of the guide means will tend to impinge on the inner wall near the apex or on the outer wall after the bend (referring to FIG. 1, the outer edge is the edge of the guide means highest up the page with the inner edge being the lower edge). This can course temporary blockage and consequential damage.

To address this, according to some embodiments, the inner edge of the guide means near the bend is contoured to urge the articles towards the outer edge of the guide means near the bend. More particularly, this portion of the guide may be configured such that the trough of the guide means is offset from midway between the inner and outer edges and is closer to the outer edge. This may cause the articles to move in the generally S-shaped path.

According to one set of embodiments, the guide means includes one or more cut outs, preferably at or proximate the second end. Configuring the guide means in this way but such that the paths of the articles are still controlled enables the guide means to have a smaller cross-section, reducing space requirements. This is particularly important where the guide means despatches the articles to a conveyor as this reduces the obstruction caused by the guide means to articles travelling from upstream thereof.

According to another set of embodiments, at least a portion of the guide means is flexible.

Preferably, the flexible portion is provided at the second end of the guide means. However, additional or alternative portions of the guide means may be flexible.

Additionally or alternatively, the guide means may be configured to receive and couple a flexible member.

Preferably, the guide means is configured to couple the flexible member at or proximate the second end of the guide means.

"Flexible" when used to refer to the guide means (or a portion thereof) or the member is to be interpreted as the guide means or member to be sufficiently flexible to deform in response to force imparted thereto by the articles at least when articles impinge thereon when received thereby.

According to a preferred set of embodiments, a substantially rigid portion of the guide means terminates at a point above the height of the articles (with reference to the surface to which the articles are despatched). The flexible member or portion then extends the guide means from said point to being proximate or in contact with the surface.

Alternatively, all or substantially all of the main body of the guide means may be flexible. For example, a flexible body may be suspended by a support structure, such as a substantially rigid frame. Preferably, the flexible body is configured to be other than taut so as to better cushion and dampen articles received thereby. Such embodiments are further beneficial in allowing for easy removal/replacement of the main body, such as for cleaning purposes, to provide alternative guide means for different types of articles or for other maintenance purposes including to provide access to other parts of the wider material transfer/sorting system.

According to such arrangements, the body may extend from the second end of the guide means down towards the surface to which the articles are despatched. Such an extension may be similar to or comprise the aforementioned flexible member or portion.

According to another set of embodiments, the guide means is configured to substantially reverse the direction of the articles, such that they exit the second end of the guide means in substantially the opposite direction to the one they were initially directed towards the first end of the guide means.

Such arrangements may be used where the articles are propelled towards the first end of the guide means, such as through use of the tipping article carriers described in WO 2004/67417.

According to these embodiments, preferably, the guide means is substantially vertical at or proximate the first end and/or substantially horizontal at the second end. Preferably, the gradient gradually reduces from the first end to the second end, reducing the speed of the article.

The guide means of these embodiments may be used in combination. For example, when the apparatus despatches articles to a conveyor, a plurality of said apparatus may be provided across the conveyor (i.e., perpendicular to the direction of travel of the conveyor) and/or along the conveyor (i.e., in the direction of travel of the conveyor).

According to a further variant of these embodiments, at least a portion of the guide means has a substantially C-shaped profile. In other words, the first end of the guide means preferably extends generally upwards and towards the initial position of the articles (e.g. the position of an article carrier according to WO 2004/67417 immediately prior to ejection therefrom). Such an arrangement can better ensure that articles are captured and transferred to the desired destination.

According to another embodiment, there is provided a means for damping the motion of the articles, such as a curtain. According to preferred embodiments the means for damping comprises a flexible suspended curtain positioned such that articles passing thereby have to displace the curtain. Such arrangements may form part of the apparatus of the invention and/or be provided separate therefrom. For example, in a system according to the invention, it may be positioned downstream of the second end of guide means of the apparatus when configured to despatch the articles to a conveyor. Such arrangements may be configured such that on passing the means for damping, the speed of the article substantially matches that of the conveyor. Note that such means may be placed at any point including upstream of the guide means and/or along the guide means.

According to a further embodiment, the guide means is configured to despatch the articles from the second end to a channelling means.

Preferably, the channelling means directs the articles along a desired path after they leave the guide means. The channelling means may further serve to slow down the articles.

According to a preferred version of this embodiment, the channelling means comprises first and second protrusions or ribs spaced so as to allow the articles to pass therebetween.

Preferably, the protrusions are substantially parallel although they may taper towards or away from each other along their length.

Preferably, the protrusions are formed from a flexible material such as rubber.

While the profile of the protrusions may vary, according to a presently preferred embodiment, they are generally triangular.

The channelling means may additionally or alternatively one or more walls that urge articles across a conveyor as it is conveyed thereby. For example, the articles may be urged towards the centre of the conveyor, centre being relative to the outer edges of the conveyor and substantially perpendicular to the direction of travel.

As will be apparent, while the channelling means may be provided as a part of the apparatus, they may alternatively be provided as part of the wider system of the invention. For example, they may be provided on or above a destination conveyor that receives the articles from the guide means.

For the avoidance of doubt, it is repeated that aspects of the aforementioned embodiments may be used in combination or in isolation.

According to a second aspect of the invention, there is provided a system for the processing of articles, the system including the apparatus of at least one of the embodiments of the first aspect.

Preferably, a plurality of said apparatus are used in combination.

Preferably, the system includes first conveyor means for conveying the articles to a position proximate the first end of the guide means.

Preferably, the system includes urging means for urging the articles from the first conveyor means towards the first end of the guide means.

Preferably, the system includes second conveyor means for receiving the articles from the second end of the guide means and conveying said articles away therefrom. However, the invention is not limited thereto and may alternatively transfer articles to bulk collection means such as a bucket or other container.

According to a preferred embodiment of the system of the invention, a plurality of apparatus are staggered across and along a conveyor to which articles are directed. By better distributing the second ends of the guide means, the distance therebetween is increased, providing a longer path for deceleration before the articles are likely to collide with one another. As will be apparent, lower energy collisions are less likely to damage the articles.

The invention also provides corresponding methods of transferring articles from a first point to a second point, with steps being analogous to the features of the apparatus of the first aspect and the system of the second aspect.

Preferred embodiments of the invention are particularly advantageous in transferring articles that may become marked or damaged as a result of more conventional processing. For example, the invention has particular application for processing fruit and other foodstuff goods, such as in the sorting or grading and/or packaging thereof. More particularly, the invention may be usefully deployed in combination with arrangements such as those described in WO 2004/67417. However, the invention is not limited thereto. More particularly, alternative means may convey and eject articles towards the guide means.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
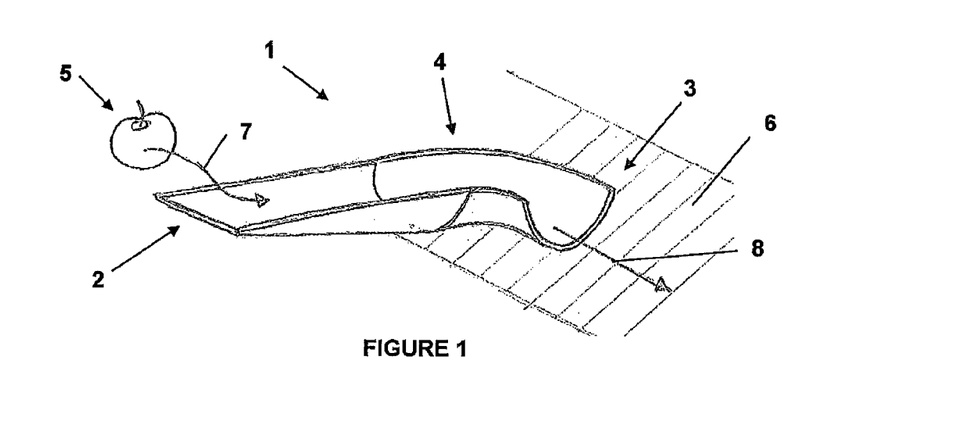
FIG. 1 is a perspective view of a first embodiment.

FIG. 1 shows a first embodiment of the invention in which a first end 2 of guide means 1 is configured to receive an article 5. The guide means 1 further includes a second end 3 for despatching the article 5, such as on to a conveyor 6. Preferably, the second end 3 terminates proximate to the conveyor 6 to avoid damage being caused by any drop of the articles 5. Arrow 7 shows an approximate path of travel of articles 5 fed to the guide means 1 and arrow 8 shows the direction of travel of the conveyor 6.

The first end 2 is preferably positioned to receive article 5 without a significant drop, so that the article 5 is not damaged as it impacts the guide means 1. To this end, according to the embodiment shown, the first end 2 has a substantially horizontal edge which becomes more curved further down the guide means 1, such that in the embodiment shown, the guide means 1 has a substantially U-shaped profile at the second end 3. The U-shaped profile helps to maintain the article 5 within the guide means 1 as it passes therealong and better controls the point of despatch of the article 5 from the guide means 1. The bend in the guide means 1 results in the articles 5 travelling in substantially the same direction as the conveyor 6, assisting in avoiding collisions (or at least more forceful collisions) both between different articles 5 and articles 5 and any walls (not shown) of the conveyor 6.

According to the embodiment of FIG. 1, the guide means 1 is preferably angled downwards from horizontal by approximately 20 degrees although the angle selected may be affected by system parameters such as the amount of space available and the types of articles being processed. Generally, a relatively small angle is desired so that the articles 5 leave the guide means 1 with a reduced speed. However, a sufficient angle should be used to ensure that articles 5 do not stall on the guide means 5, otherwise articles bunch together increasing the number of collisions.

Thus, according to the embodiment of FIG. 1, major impacts to the articles 5 are at least reduced and the articles 5 are gradually re-directed to a desired path.

A problem with the arrangement of FIG. 1 is that the guide means 1, particularly the second end 2, effectively blocks a portion of the width of the conveyor 6. This results in articles that are received upstream of the shown guide means 1 impacting therewith. Also, since the path of such articles must alter to go around the obstruction, this results in the bunching up of articles in the reduced space.

Figure 2:
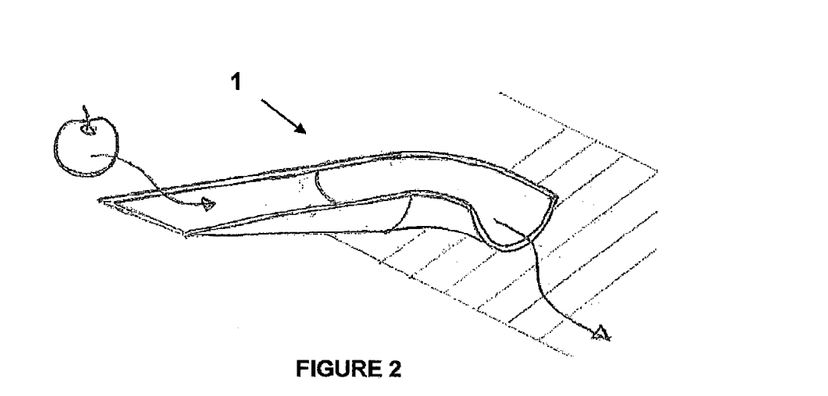
FIG. 2 is a perspective view of a similar embodiment to that of FIG. 1, but with the apparatus of the invention more highly elevated.

To address this, in the embodiment shown in FIG. 2, the second end 3 of the guide means 1 terminates some distance above the conveyor 6, preferably at a height greater than that of the articles 5. Consequently, articles 5 may pass under the guide means 1, enabling the articles to be distributed across the full width of the conveyor 6.

However, as will be appreciated, there is the possibility that articles 5 despatched from the guide means 1 may drop on an article passing underneath. Alternatively, an article upstream of the second end 3 may collide with the article 5 at or near the time the article 5 impacts the conveyor 6. Such unwanted impacts may be avoided by providing a wall that extends down (preferably substantially vertically although it may be sloped to avoid a straight drop) from the second end 3 of guide means 1 towards the conveyor 6. Preferably, the wall (not shown) terminates proximate the conveyor 6, or at least close enough thereto to avoid articles 5 passing underneath its lower edge.

Preferably, when viewed from above, the wall has an angled profile. More preferably, the profile is substantially C-shaped, wherein the wall appears convex when viewed from upstream. This enables articles to be more gently diverted around the wall.

The wall may narrow from a first width proximate the second end of the guide means to a second, lesser width proximate the conveyor 6. This reduces the obstruction caused by the wall and more precisely places articles 5 on the conveyor 6. Further rather than having a C-profile, the wall may be closed (when viewed from above) at least at an upper portion thereof, forming at least a partial downpipe.

Figure 3:
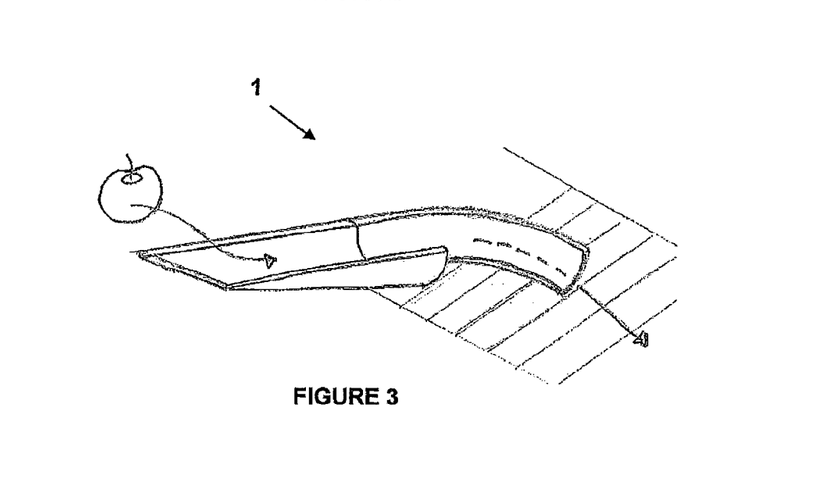
FIGS. 3-5 are perspective views of alternative embodiments.

FIG. 3 shows a variation of the embodiment of FIG. 1 in which a portion of the guide means 1 at the second end has been removed. It will be appreciated that the guide means 1 shown in FIG. 3 will be sufficient to direct articles 5 provided they travel at a sufficient speed. The reduced width of the guide means 1 proximate the conveyor 6 reduces the amount of obstruction caused. Further, this arrangement helps avoid issues with articles 5 bunching together in the guide means 1, resulting in the possibility of using shallower angles for the guide means 1, which can in turn result in slower speeds and less damage. This is achieved by articles 5 that do group together falling laterally out of the guide means 1 in the region of the cut out.

Figure 4:
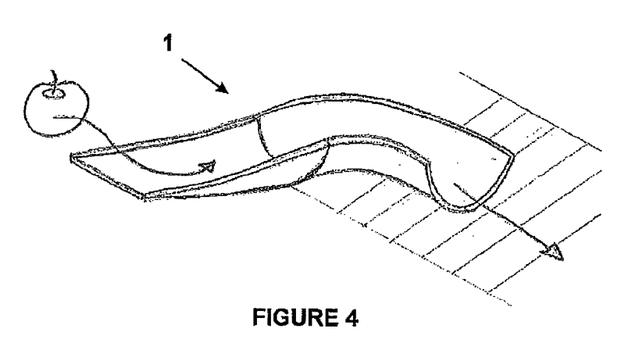

FIG. 4 shows a further embodiment of guide means 1 having a generally ?-shaped profile when viewed from above. In other words, as articles 5 are directed along the guide means 1, they move partly upstream before bending around and despatching articles in approximately the same direction as the conveyor 6. By causing additional deviation of the paths of the articles 5, this arrangement can aid in decelerating articles as they pass along the guide means 1. Further, this enables the portion of the guide means 1 that extends substantially transverse to the conveyor 6 to be more elevated since the portion running in the direction of the conveyor 6 may be longer but still terminate at the same point. Consequently, obstruction caused by the transverse portion to articles travelling thereunder can be reduced or eliminated.

Further shown in FIG. 4, the guide means 1 has a curved profile proximate the first end 2 (when viewed in cross-section along the general direction of travel i.e., the height of the trough of the guide means from the first end to the second end), such that the gradient of the lower surface of the guide means 1 reduces as the articles 5 travel therealong. Such an arrangement can better ensure that the articles are quickly moved away from the first end before being slowed down, better avoiding bunching up of articles 5.

Figure 5:
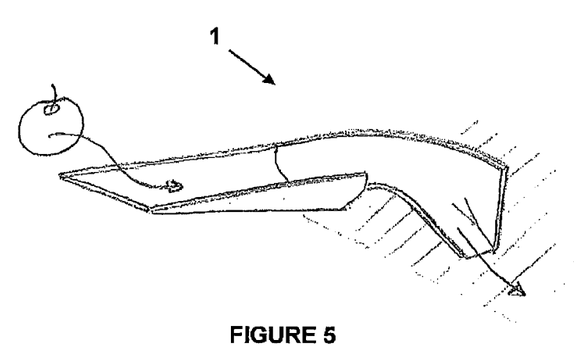

FIG. 5 shows a further alternative embodiment in which the second end 3 of the guide means 1 provides an angled ramp for gently delivering articles onto the conveyor 6. Similar to the arrangement of FIG. 3, the cut away portion at the second end of the guide means 1 of FIG. 5 reduces the obstruction caused to articles 5 travelling from upstream thereof and also enables articles 5 that bunch together to become separated by falling away laterally (i.e., substantially perpendicular to the direction of travel of conveyor 6).

It will be appreciated that the guide means of FIGS. 3-5 may terminate at the second end 3 proximate the conveyor 6, or spaced away therefrom, similar to the embodiment shown in FIG. 2.

Figure 6A:
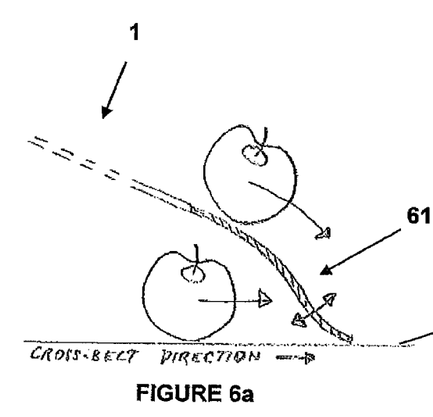
FIGS. 6a-6b are side and perspective views of a further embodiment.
Figure 6B:
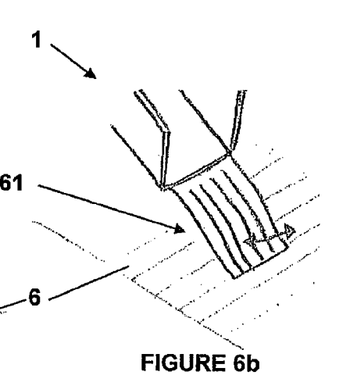

FIGS. 6a and 6b show side and perspective views of a portion of a guide means 1 according to another embodiment. According to this embodiment, the guide means includes (or is configured to securably receive) a flexible portion 61 which gently guides articles 5 down to the level of the conveyor 6. The flexible portion 61 may be a sheet of flexible material and preferably has a plurality of cuts along at least a portion of its length so as to form fingers, the open tips of which terminate downstream of the substantially rigid portion of the guide means 1.

The flexible portion 61 can act in two ways. Firstly, if the upper article 5 shown in FIG. 6a reaches the flexible portion 61 first, the lower article is prevented from passing the flexible portion 61 as it is unable to move upwards. Conversely, if the lower article reaches the flexible portion 61 first, the flexible portion 61 will turn up at the end thereof, preventing the upper article 5 from passing until after the lower article 5 is clear of the guide means 1. Consequently, articles 5 may be spread more widely along the length of the conveyor 6, helping to avoid collisions between articles 5.

Figure 7A:
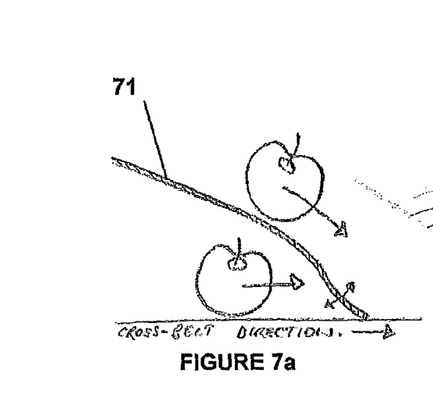
FIGS. 7a-7b are side and perspective views of a further embodiment.
Figure 7B:
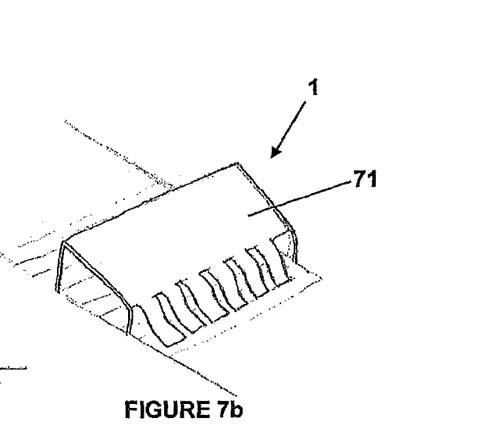

FIGS. 7a and 7b show side and perspective views of an embodiment similar to that of FIGS. 6a and 6b except that the main body 71 of the guide means 1 is flexible. For example, it may be formed from a flexible sheet of material that is suspended over the conveyor 6 and having a slope of approximately 20 degrees. Again, a sufficient angle is required to prevent articles from stalling and bunching together at or near to the guide means 1 but the angle will vary depending on system parameters.

It will be appreciated that the main body should be sufficiently tort to allow articles 5 to move thereover and prevent stalling and the resulting bunching up of articles 5. On the other hand, some flexibility or give is required to realise the full benefits of this arrangement.

The main body 71 effectively forms a hammock for the articles 5 as they pass thereover, cushioning the initial impact of articles with the guide means 1 as well as slowing the articles 5 during the course of their passage. To enable articles 5 to pass thereunder, when required, the body 71 is preferably suspended at a height such that even when one or more articles are present thereon, no obstruction is caused i.e., the body 71 maintains a height greater than the height of the articles 5.

Baffles and/or endwalls may be provided on the upper surface of the main body 71, channeling the articles 5 as they pass thereover and better dispersing them.

To facilitate transfer of articles 5 from the guide means 1 to the conveyor 6, a flexible portion 61 may be coupled to the main body 71 with the aforementioned advantages thereof. Alternatively, as shown in FIGS. 7a and 7b, the fingers may be integral to the main body 71.

Figure 14:
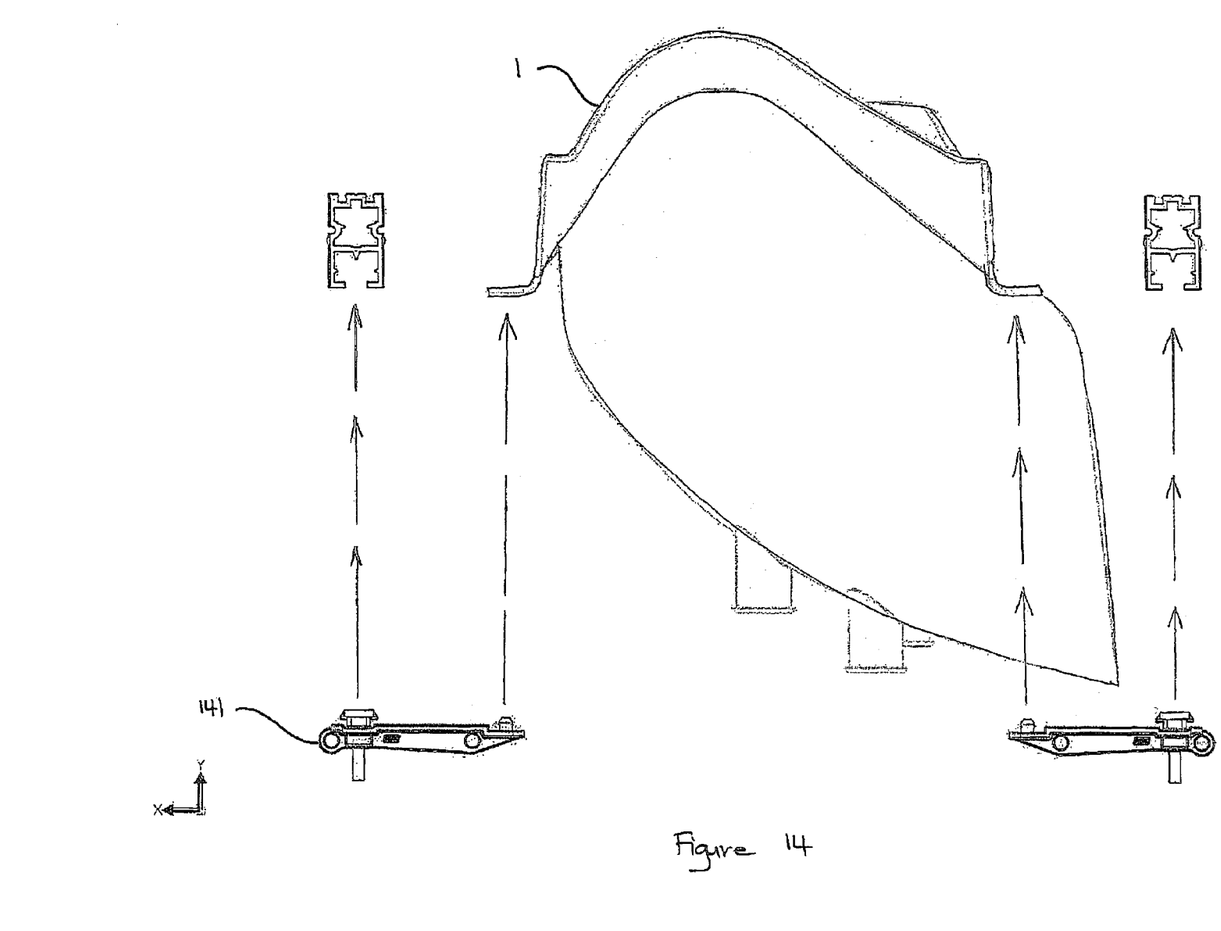
FIG. 14 is an exploded side view of a further embodiment.

Note that more complex designs of the main body of the guide means may be formed from a flexible material, such as plastics, including but not limited to those of FIGS. 1 and 4. Such an arrangement is shown in FIG. 14 which shows an exploded view of a guide means 1 and frame assembly 141.

Such arrangements are beneficial due to the cushioning provided by the walls, such as near to the bend in a substantially L-shaped guide means. Further, suspending the guide means from a frame provides for easy removal or replacement. As will be appreciated, fixing means may be used to releasably secure the guide means to the framework. Known fixing means may be used, including screws although quick release arrangements will provide for improved usability.

Further, portions of the guide means may have increased rigidity so as to reduce the requirements of the framework. For example, the uppermost outer edges of the sidewalls of the guide means may be provided with a flange having increased rigidity. According to this embodiment, holes may be provided in the flange for receiving hooks that may, for example, be suspended from chains. The rigidity provided by the flange serves to enable the guide means to retain its general desired shape but still provide the necessary "give" or flexibility. The flange may be stiffened as desired, including by treating the material thereat (including increasing the thickness thereof), providing a substantially rigid or more rigid insert or fixing a substantially rigid or more rigid member thereto.

It will be appreciated that a wide variety of framework configurations may be used while still meeting the desired objectives. All such variations are included within the scope of the invention.

Figure 8:
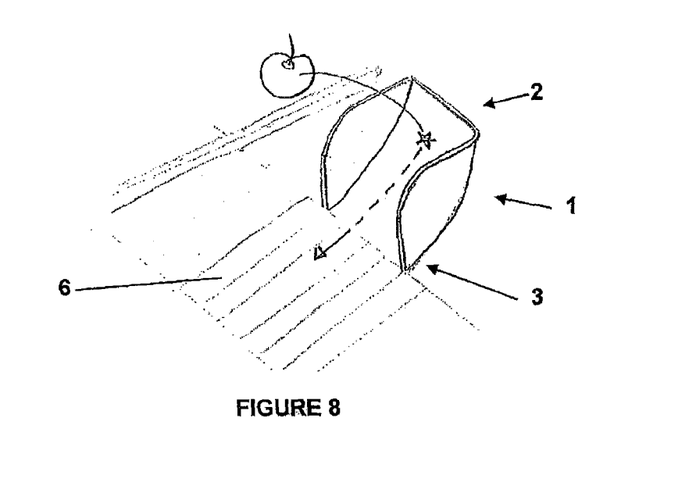
FIGS. 8-9 are perspective views of further embodiments.
Figure 9:
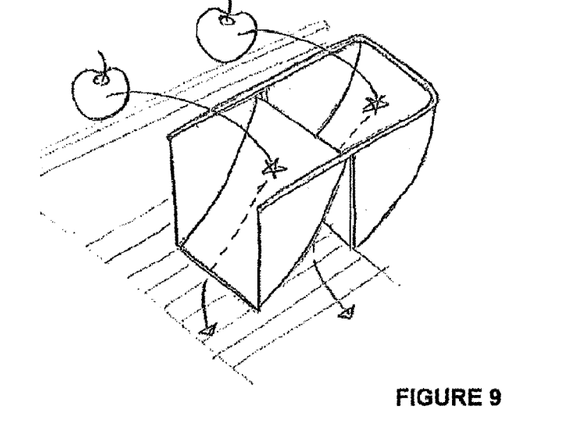

FIG. 8 shows an alternative arrangement in which articles 5 are propelled towards the first end 2 of the guide means 1 and despatched at the second end 3 at or proximate the conveyor 6. Preferably, according to this embodiment, the guide means 1 is formed from a flexible material to cushion the articles as they hit the guide means 1. The guide means 1 directs the articles downward, along the angled surface thereof and onto the conveyor 6. The sloping of the guide means 1 serves to absorb much of the kinetic energy of the articles 5, enabling the articles 5 to exit the guide means 1 slower than the speed at entry.

According to the embodiment shown, the guide means 1 is positioned at the side of the conveyor 6. Such an arrangement is beneficial in that the guide means 1 does not obstruct the passage of articles along the conveyor 6.

A problem with the arrangement of FIG. 8 is that articles 5 that are often fed to the guide means 1 in quick succession and may therefore collide with one another, particularly proximate the first end 2. Consequently, according to one embodiment, additional said guide means 1 may be provided to operate in parallel with the ejection of articles thereto being alternated therebetween. To realise this embodiment, additional control and/or actuation means are required to correctly eject the articles to the different destinations.

It will be appreciated that the guide means 1 of FIGS. 7 and 8 may be oriented to despatch articles 5 so that their direction of travel substantially matches that of the conveyor 6. According to such embodiments, preferably, the width of the guide means 1 reduces from being wider at the first end 2 to better capture the articles 5 to being narrower at the second end 3 to more precisely despatch the articles 5 and reduce the obstruction caused to the conveyor 6.

Figure 10:
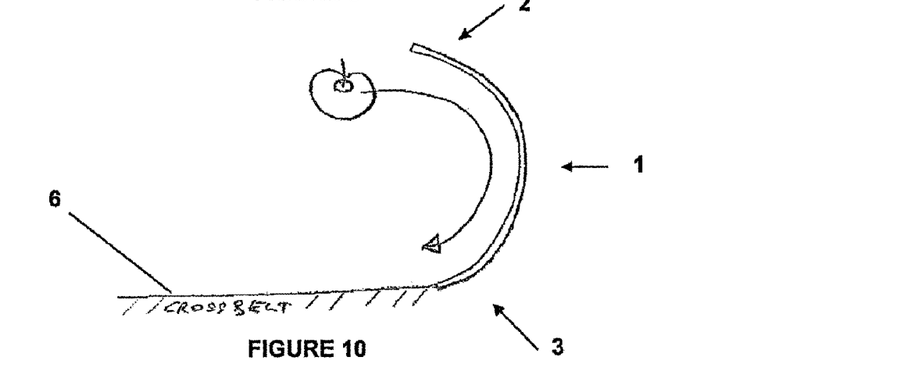
FIG. 10 is a side view of another embodiment.

FIG. 10 shows an adaptation of the embodiment of FIG. 8 in which the first end 2 of the guide means 1 extends further upwards and in the direction opposite to that of the article 5 on entry to the guide means 1. This arrangement can be used to soften the initial impact of the articles against the guide means 1 as well as better ensure that all articles 5 are captured thereby.

Figure 11:
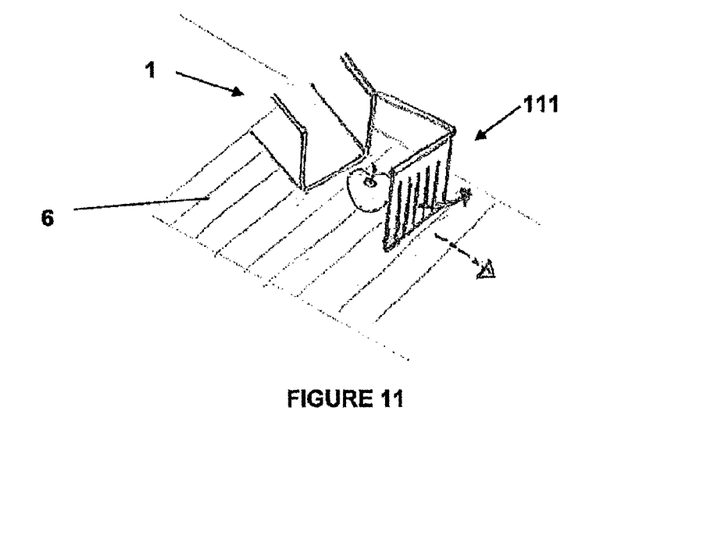
FIGS. 11-12 are perspective views of further embodiments.

FIG. 11 illustrates means for reducing the speed of the articles 5. More particularly, FIG. 11 shows a suspended curtain 111, formed from a flexible material. The curtain 111 may be a complete sheet or, as shown, include one or more cuts so as to form fingers. As will be appreciated, the speed of articles 5 is reduced by impact on the curtain 11 and the force required to sufficiently fold the curtain to enable the articles 5 to pass. Further the flexibility of the curtain 111 can be configured to result in a desired reduction in speed.

According to the arrangement shown in FIG. 11, the curtain 111 is spaced some distance downstream of the guide means 1. This helps avoid articles bunching and hence colliding at or about the curtain 111, or at least they do so with less energy in view of the longer deceleration path. However, the curtain 111 may be placed elsewhere. For example, at or proximate (or even upstream of) the second end 3 of the guide means 1. Further, more than one such curtain 111 may be placed along the paths of the articles 5. Multiple curtains 111, each having a relatively small resistance, have the advantage of more gradually reducing the speeds of the articles 5 and may therefore better prevent articles 5 bunching together.

Figure 12:
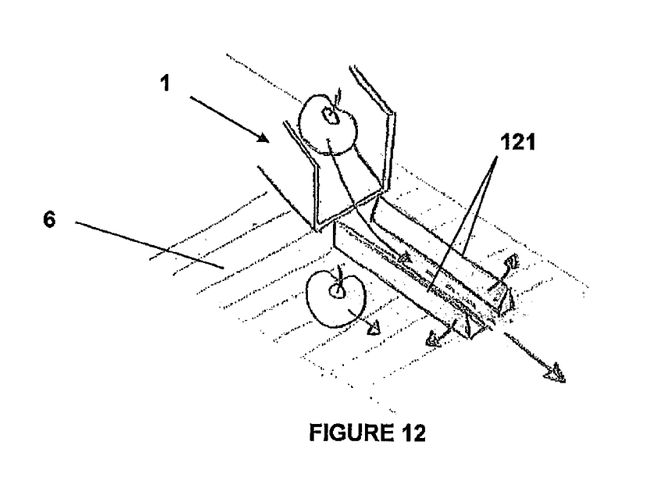

FIG. 12 shows an embodiment for channelling the passage of articles 1 along the conveyor 6. Through appropriate configuration, it can also serve to reduce the speeds of the articles 5.

More particularly, two (preferably flexible) ridges 121 are positioned on the conveyor 6 for receiving the articles 5 after exiting the guide means 1. The ridges 121 form a lane or channel into which the articles 5 are directed. Along this channel, the articles 5 may be slowed down to the conveyor 6 velocity as well as being aligned in a lane (i.e., to the direction of the conveyor 6). The ridges 121 also serve to separate the exiting articles 5 from articles 5 already present on the conveyor 6 (as shown), thereby reducing collisions.

According to a preferred embodiment, the ridges 121 may be moved closer together or further apart depending on the size and shape of the articles 5. While between the ridges 121, the articles 5 are preferably always in contact with the conveyor 6, such that they are continuously moving, thereby preventing articles 5 from bunching together and colliding. The profile of the ridges 121 may be selected as desired but preferably tapers to some degree the further away from the surface of the conveyor 6 to aid in receipt of the articles 5 therebetween. According to the embodiment shown, the ridges 121 have a substantially triangular profile. According to this implementation, preferably, the ridges 121 have a shallow angle so that they make contact with the articles as low as possible, allowing "stray" articles to jump out of the channel if necessary.

Figure 13:
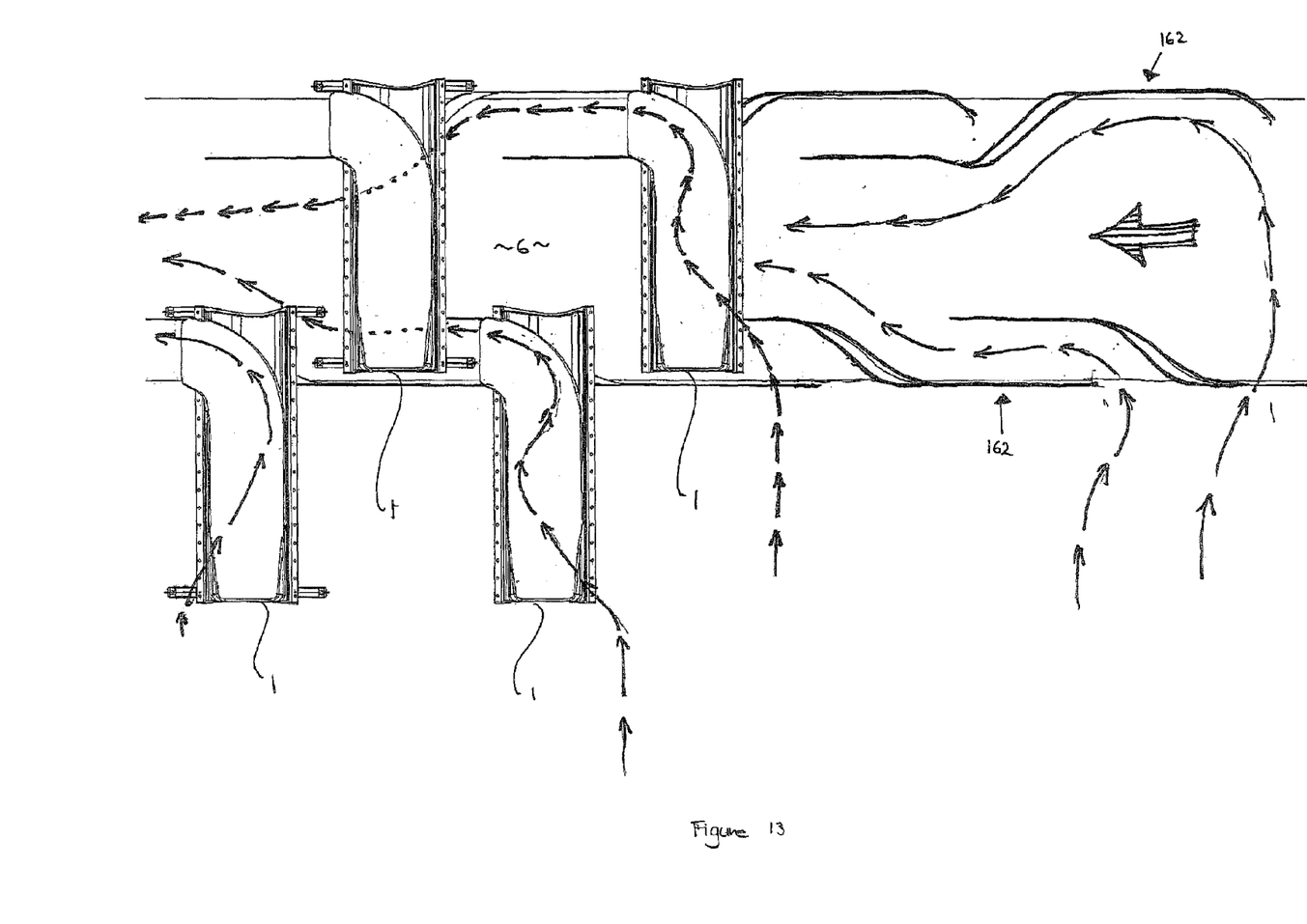
FIG. 13 is a plan view of a further embodiment.

FIG. 13 illustrates a plan view of a system according to an embodiment of the invention. According to this arrangement, plural apparatus of the invention are staggered along and across the conveyor 6, more evenly distributing articles 5 over the conveyor 6. By providing two parallel processing paths, it is possible to double the 'slow-down' distance once articles exit a guide means 1, before reaching the next guide means 1. The longer deceleration path means that if articles 5 do collide, they are likely to do so at lower speed and are therefore less likely to damage the articles.

As shown in FIG. 13 by the arrows indicating possible passages of travel of the articles 5 inside and downstream of the guide means 1, the articles 5 may be diverted around the exit points of downstream guide means 1. This may be achieved by providing a raised portion in the conveyor 6 surface. At 162, guide means 1 have been omitted to more clearly show an example raised portion. Alternatively, the upstream face of the second end 3 of the guide means 1 may be suitably configured. For example, it may taper to become narrower further upstream.

While not shown, the conveyor 6 according to this arrangement could advantageously be configured to have a trough profile (when viewed from the end), helping to migrate articles to the centerline of the conveyor 6. As will be appreciated, alternatively, multiple troughs may be provided. For example, a first trough could be configured to receive articles from the upper guide means 1 shown in FIG. 13 and a second trough could be configured to receive articles from the lower guide means 1 shown in FIG. 13.

While particular conveyor means 6 have been shown, the invention is not limited thereto. Articles may be received by any form of conveyor known in the art, as well as receptacles that receive one or multiple said articles.

Preferably, the surface of the guide means is configured to cause the articles to move in a substantially L- and/or S-shaped path.

When the guide means is substantially L-shaped, with the apex preferably rounded, articles that follow the path around the outer edge of the guide means generally travel smoothly. However, articles that travel proximate the inner side of the guide means will tend to impinge on the inner wall near the apex or on the outer wall after the bend (referring to FIG. 1, the outer edge is the edge of the guide means highest up the page with the inner edge being the lower edge). This can course temporary blockage and consequential damage.

Figure 15A:
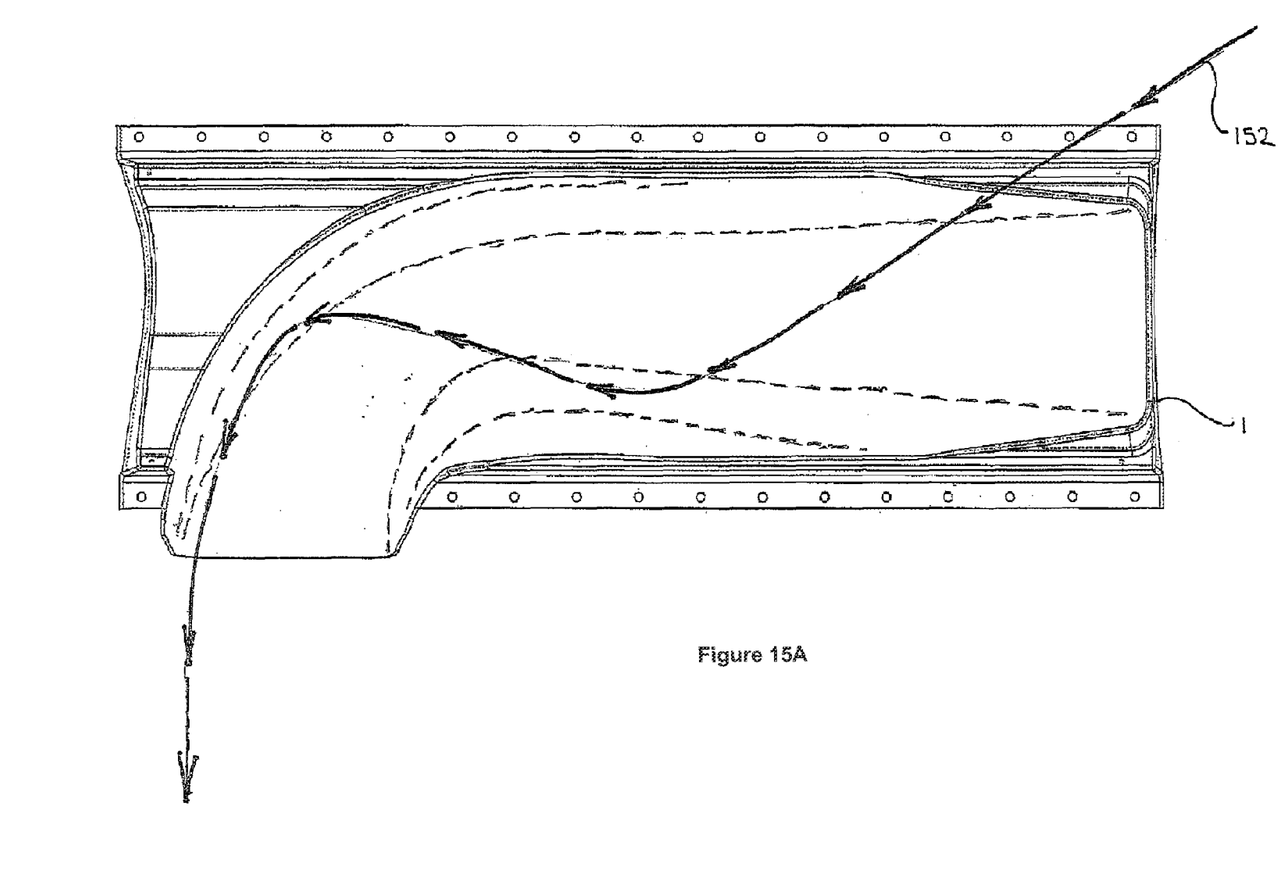
FIGS. 15A-15B are top views of a further embodiment.

To address this, according to some embodiments, the inner edge of the guide means near the bend is contoured to urge the articles towards the outer edge of the guide means near the bend. More particularly, this portion of the guide means may be configured such that the trough of the guide means is offset from midway between the inner and outer edges and is closer to the outer edge. This may cause the articles to move in a generally S-shaped path. An example arrangement for achieving this is illustrated in FIG. 15A.

Figure 15B:
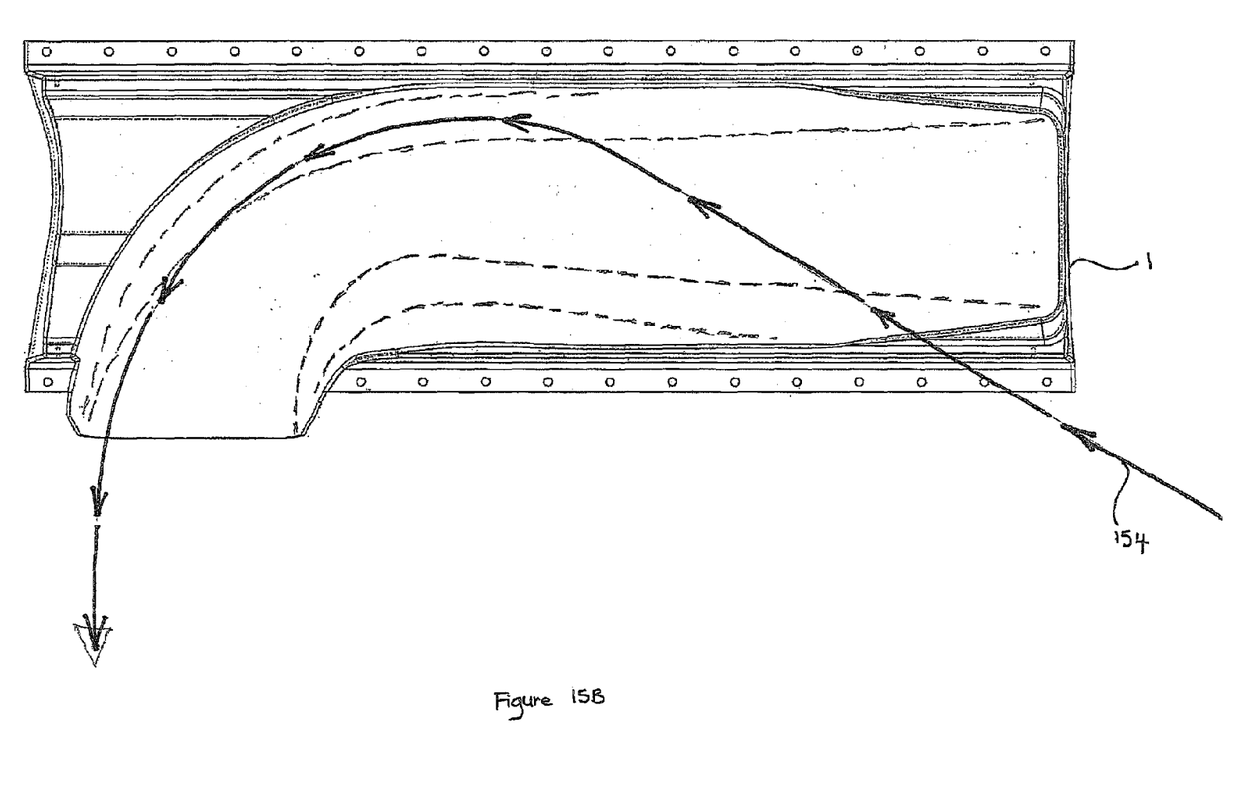

As will be appreciated, where the guide means is used to transfer articles from a first conveyor to a second conveyor, the momentum caused by the first conveyor may cause the articles to be received by the guide means in a non-ideal manner. For example, for embodiments where the guide means is generally L-shaped, the articles may impinge on the sidewalls of the guide means near the first end, rather than being received neatly down the centre of the first section of the L. The embodiment of FIGS. 15A and 15B further serves to improve the path of articles therethrough that are received with such undesirable travel vectors. Yet further, the arrangement of FIGS. 15A and 15B is able to receive articles from either side of the first section of the L, providing improved flexibility but also enabling a single guide means to receive articles from two different conveyors, the conveyors placed either side of the guide means. For example, articles received from a first side will travel along a generally S-shaped path 152 shown in FIG. 15A and articles received from the other side will travel along the generally falcate path 154 shown in FIG. 15B.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

The invention claimed is:

1. An apparatus for transferring an article, the apparatus including:
    guide means, the guide means having:
        a body;
        a first end for receiving the article; and
        a second end for despatching the article
        the guide means gradually changing from being substantially horizontal at the first end to concave at the second end;
        the guide means having a bend between the first and second ends when viewed from above;
        and wherein the inner edge of the guide means near the bend is contoured to urge articles towards the outer edge of the guide means near the bend.

2. The apparatus of claim 1, wherein a trough developed along the length of the guide means by the increasingly concave profile of the guide means is offset from the mid-line of the guide means towards the outer edge of the bend.

3. The apparatus of claim 1 configured, in use, to cause articles to move along a generally S-shaped path between the first and second ends of the guide means.

4. The apparatus of claim 1, wherein the guide means includes a low-friction surface across which the article may move.

5. The apparatus of claim 1, wherein the first end is more elevated than the second end and the guide means is angled downwards from the horizontal by approximately 20 degrees.

6. The apparatus of claim 1, wherein the second end, in use, is proximate a surface onto which articles are received;
    wherein the second end, in use, is vertically spaced away from a surface onto which the articles are received; and wherein the spacing is greater than the height of the article, thereby allowing other such articles to pass thereunder.

7. The apparatus of claim 6, wherein the guide means is configured to dispatch the articles from the second end to a channelling means, the channelling means includes first and second ribs spaced so as to allow the articles to pass therethrough.

8. The apparatus of claim 7, wherein the first and second ribs are substantially parallel.

9. The apparatus of claim 7, wherein the first and second ribs taper towards or away from one another along their length.

10. The apparatus of claim 7, wherein the first and second ribs have a substantially triangular profile.

11. The apparatus of claim 1, wherein the guide means is adapted to substantially reverse the direction of travel of the articles.

12. The apparatus of claim 1, wherein the guide means is configured to despatch the articles from the second end to a channelling means, which is adapted to direct the article along a predetermined path after the article is despatched from the second end to reduce the speed of the article.

13. The apparatus of claim 1, adapted to receive the article from either side of the guide means.

14. The apparatus of claim 1 having one or more cut-outs or a portion of the wall otherwise absent, proximate the second end of the guide means.

15. A system for processing articles including:
guide means, the guide means having:
a body;
a first end for receiving the article; and
a second end for despatching the article;
the guide means gradually changing from being substantially horizontal at the first end to concave at the second end;
the guide means having a bend between the first and second ends when viewed from above;
and wherein the inner edge of the guide means near the bend is contoured to urge articles towards the outer edge of the guide means near the bend.

16. The system of claim 15, including first conveyor means for conveying the articles to a position proximate the first end of the guide means, and urging means for urging the articles from the first conveyor means towards the first end of the guide means.

17. A system for processing articles including a plurality of apparatus for transferring an article, each apparatus including:
guide means, the guide means having:
a body;
a first end for receiving the article; and
a second end for despatching the article;
the guide means gradually changing from being substantially horizontal at the first end to concave at the second end;
the guide means having a bend between the first and second ends when viewed from above;
and wherein the inner edge of the guide means near the bend is contoured to urge articles towards the outer edge of the guide means near the bend;
the system further including:
first conveyor means for conveying the articles to a position proximate the first end of the guide means;
second conveyor means for receiving the articles from the second end of the guide means and conveying the articles away therefrom;
wherein the plurality of apparatus are staggered across and/or along the second conveyor means, in use.

18. The system of claim 17, wherein the plurality of apparatus are substantially aligned along the second conveyor means in one or more lanes.

* * * * *